Aug. 13, 1968 RYUICHI ISHII ET AL 3,397,287

AUTOMATIC ANSWER-BACK SYSTEM

Filed Aug. 18, 1964

30 FIG. 3

INVENTORS
RYUICHI ISHII
HIDEO TOTANI

BY

OSTROLENK, FABER, GERB & SOFFEN
ATTORNEYS

United States Patent Office 3,397,28

Patented Aug. 13, 196

3,397,287

AUTOMATIC ANSWER-BACK SYSTEM

Ryuichi Ishii and Hideo Totani, Tokyo, Japan, assignors to Nippon Electric Company Ltd., Minatoku, Tokyo, Japan Filed Aug. 18, 1964, Ser. No. 390,415
Claims priority, application Japan, Aug. 26, 1963, 38/45,608
7 Claims. (Cl. 179—2)

ABSTRACT OF THE DISCLOSURE

An automatic answer-back system for use in conventional telephone networks wherein the calling party may establish the right of the called party to receive digital-type data commonly used in data processing equipment by examination of an answer-back code transmitted by the called party to the calling party. Equipment is provided for storing the presence of predetermined characters in selective positions of the answer-back code immediately after the last selected position examined has been received. These are provided to determine whether the presence of all selected characters in their selected positions were appropriately transmitted so as to produce a signal enabling the transmission of digital-type data from the calling to the called party. Failure in the receipt of any predetermined character in its appropriate position prevents transmission of the digital data requiring either a retransmission of the answer-back code or the replacement of the call by the calling party to the desired called party.

The instant invention relates to communications systems and more particularly to means for identifying an answer-back signal in order to establish whether continuation of data transmission should occur based upon the validity of the answer-back message.

Data communications find widespread use throughout a variety of applications. Presently, in both industrial as well as military applications, it has become advantageous to transmit data in binary fashion, for example, over voice communications links due to the increased speeds at which such data can be transmitted, and further due to the advantages of preparing data in binary form for its immediately subsequent use which may, for example, be in a computer or data processing device, which typically is designed to accept binary information at its input.

In applications where a number of divisions or departments of a single company or organization, for example, are geographically located throughout the country, it is quite frequently desirable to establish data communications between such divisions for engineering as well as business or accounting purposes, since data to be transmitted may require further processing at the location where the data is to be transmitted. It is highly desirable to present this data in a form suitable for simple and ready insertion into the computing or data processing equipment at the receiving point. Since such geographically spaced locations are typically connected to one another by telephone networks, it becomes extremely advantageous, especially from the economic viewpoint, to utilize these telephone links as the communications media simply by establishing a routine telephone connection between two locations and then injecting the data into the link for transmission from sender to receiver. Data transmission of this type is further advantageous due to the high transmission speeds which may be employed thereby making more efficient use of the data link.

Since the telephone network services an extremely large number of subscribers it is obvious that a very small portion of the total number of subscribers will be affiliated with the company above mentioned which desires to establish connection through the telephone network be tween its various departments or divisions with these con nections acting as the medium for sending and receivin data communications. Since the various locations and de partments of such a company, which is connected to th telephone network, are not continuously coupled to on another and since to be so coupled to one another neces sitates the establishment of a link connection therebe tween, usually by a normal telephone dialing operation, i becomes extremely advantageous to establish whether th called party to which the calling party wishes to transmi data is in fact a member of the same company and is proper called party for receiving such data communica tions.

The instant invention provides an answer-back cod format and suitable means for decoding the answer-bac format in order to insure the fact that a calling party afte having been connected to a called party may, nevertheless establish whether this called party forms a part of th group entitled to receive data communications from th calling party.

The instant invention is characterized by use of a answer-back code having a particular format in whic predetermined locations within the answer-back signa contain the coded elements representing characters whic may, for example, be characters identifying the compan name, in order to clearly establish the fact that the calle party is capable of generating such an answer-back sig nal is entitled to receive such data communications.

Means are provided at the sending party location fo the purpose of demodulating and decoding the answe back signal in order to establish whether this connectio should or should not receive the data communications The means for decoding the answer-back signal estab lishes a valid answer-back code by checking the charac ters of the answer-back code on only predetermined posi tions thereof and, secondly, by checking for the presenc of only certain characters in these specified character posi tions. The answer-back signal decoding equipment is se up in such a way as to provide a signal indicative of re ceipt of a valid answer-back code format and conversel for providing a signal indicative of the failure to receiv an answer-back code thereby establishing the fact tha the called party is not entitled to receive the data whic the calling party desires to transmit. The calling party ha the option of requesting a repeat transmission of th answer-back signal to avoid the possibility that noise o the link has caused erroring of the answer-back cod where the calling party may exercise the option o disconnecting the circuit between itself and the calle party and redialing to establish the new connection to th appropriate called party at which time the request for a answer-back code is then requested of the new, and hope fully correct, called party.

The answer-back code format and the answer-back de coding means are provided with sufficient flexibility t permit the free alternation of the characters used t establish the identity of the called party and also the fre alternation of the position of these characters within th answer-back code format.

It is, therefore, one object of the instant invention t provide novel means for establishing the identity of called party to a calling party in a communications link Another object of the instant invention is to provid novel answer-back systems for communications system and the like.

Another object of the instant invention is to provide novel answer-back system for communications system and the like wherein the answer-back system include means for examining predetermined character position in the answer-back code format and further for establish ing the identity of predetermined characters within th forementioned predetermined character positions for the urpose of establishing the proper identity of the called arty.

These and other objects of the instant invention will ecome apparent when reading the accompanying descrip-.on and drawings in which:

FIG. 3 is a circuit diagram showing the answer-back ignal decoding means for establishing validity of an nswer-back signal and which is designed in accordance /ith the principles of the instant invention.

Figure 1:
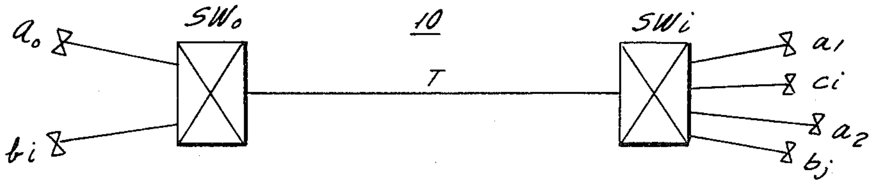
FIG. 1 is a block diagram showing an exchange system ıcorporating the instant invention.

When subscribers to an exchange system 10 as shown ı FIG. 1 such as a telephone exchange system, for ex-mple, which is intended for a large number of un-pecified subscribers, carry on digital communications, ɔmetimes the specific subscribers carry on more digital ommunications with subscribers of the same organi-ation or establishment to which the former belong than ɔ those unspecified subscribers.

If a call from a subscriber $a_0$ to another subscriber $a_1$ elonging to the same establishment or company A is stablished and if the communications addressed to the ubscribed $a_1$ is also transmitted to subscriber $a_2$ (which ; also a member of establishment A) it can reasonably e expected that the subscriber $a_2$ will send back the com-ıunications to subscriber $a_1$ insofar as they belong to the ame establishment A as shown in the arrangement of 'IG. 1. First and second central exchanges $SW_0$ and $SW_1$ re provided therein, and connected by a toll line T and ırough which the calling subscribed $a_0$ contacts the call ubscribers $a_1$ or $a_2$. It is not necessary that subscribers e coupled to more than one central exchange as vidended by the fact that subscribers serviced by one entral exchange may be successfully connected as it is ıe case with the subscribers $a_1$ and $a_2$ connected through ıe central exchange $SW_1$.

In the case where subscriber $a_2$ is connected to sub-criber $a_0$, which caused the establishment of the con-ection, any transmission to subscriber $a_0$ establishes the ıct it is a valid calling party entitled to receive such data ommunications.

Thus subscriber $a_2$ will refrain from transmitting data ommunications to subscriber $a_0$ until it receives an nswer-back signal of the proper code format establishing self as a member of the same establishment.

The instant invention provides an automatic answer-ack system which uses answer-back signals which ꝫpresent the call letters of an establishment, for example, ɔ distinguish subscribers belonging to the establishment ı or comprising such call letters and further signals ꝫpresenting the identity of each individual terminal $a_0$, $a_1$, $a_2$, etc.) in such manner that these signals occupy redetermined positions in the communications signal to e transmitted. Reception of the answer-back signal stablishes, by looking for the presence or absence of a redetermined character in predetermined positions with-ı the answer-back signal format, whether or not the ata communications link should be established with the alled party. Thus, the subscribers $b_1$ and $b_j$ which may elong to establishment B and the general subscribers $c_1$ 'hich are members of the communications network 10 'ill not be able to receive data communications from the ıbscriber $a_2$, for example, due to the fact that they will ot be generating the required answer-back signal format ven though they may be connected through the tele-hone link.

Figure 2A:
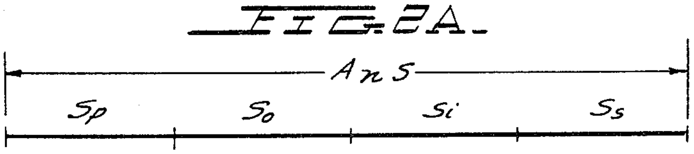
FIG. 2 shows the code format of the answer-back signal mployed in the instant invention.
Figure 2B:
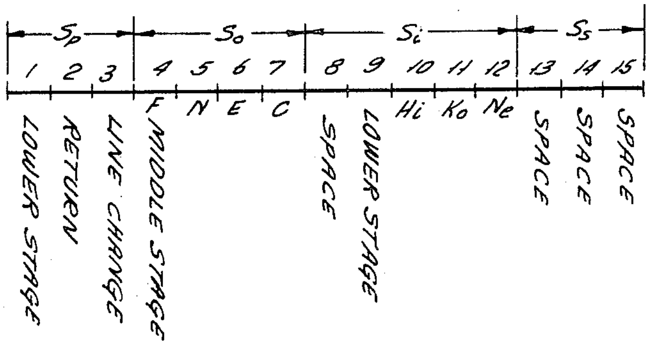

FIGS. 2A and 2B illustrate an answer-back signal ac-ɔrding to the invention in which FIG. 2A shows the en-re structure and FIG. 2B shows the answer-back signal ı greater detail. In the arrangement of FIG. 2A the /mbol $S_p$ denotes a prefix character; $S_0$ is a signal ꝫpresenting the call letters of an establishment; $S_1$ is a terminal signal representing the called party, for example, and $S_s$ is a suffix or end of word character. An answer-back signal consists of all the parts, $S_p$, $S_0$, $S_1$, and $S_s$, and the entire format is designated by $A_nS$.

Assuming now that an establishment A is represented by the characters NEC (Nippon Electric Company) in the middle stage $S_0$ all the answer-back signals of the sub-scribers $a_0$, $a_1$, $a_2$, etc., belonging to establishment A are arranged to include these characters in the same identical position within their answer-back signal format, which, in the answer-back format of FIG. 2(B), occupy positions 4 through 7 of the 15 position format. If all of the characters in this position are so arranged as to differ from the characters of other subscribers belonging to other establishments and of other general subscribers in the network 10, it is thereby possible to automatically determine whether a called party is a subscriber belong-ing to the establishment A or not, simply by checking the $S_0$ portion of the answer-back signal format $A_nS$. The sequence of order of $S_p$, $S_0$, $S_1$, and $S_s$ may be arranged in any desired manner other than the format shown in FIG. 2 with the only requirement being that arrangement selected should be common to all terminals of the estab-lishment A in the system 10. Thus, the invention is con-cerned with a system for fixing the position and contents of at least a portion $S_0$ of the answer-back format.

FIGURE 3 illustrates one practical circuit 30, which may be employed for checking the answer-back signal of an establishment incorporating the answer-back format given in FIG. 2(B). The answer-back decoding circuit 30 of FIG. 3 is comprised of relay solenoids F, N, E and C which operate contacts sets $f_1$–$f_2$, $n_1$–$n_2$, $e_1$–$e_2$, and $c_1$–$c_2$, respectively. The relay solenoids are sequentially coupled to a rotary stepping switch 31 having a rotatably driven arm 32 operating with a pluarity of contacts numbered 1 through 11 and further cooperating with the indicated lamps AL and OK in a manner to be more fully described.

The operation of the answer-back decoding circuit 30 of FIG. 3 located at the subscriber location $a_2$ which is now desirous of transmitting data to subscriber location $a_0$ is as follows: As soon as the link is established be-tween $a_2$ and $a_0$, and prior to reception of the answer-back signal of subscriber $a_0$ at $a_2$, the contact $y$ of FIGURE 3 moves to the closed position. As each character of the answer-back signal format is received, the arm 32 of rotary stepping switch 31 advances one position. Thus, through the receipt of the first 3 character positions 1 through 3, in portion $S_p$ shown in FIG. 2(B) the rotary arm 32 will have stepped through its contact positions 1, 2 and 3 and will engage the contact position 4 in readiness for receipt of the middle stage character position 4 in portion $S_0$ of the answer-back format $A_nS$. If the character F is received at this time and decoded at the calling loca-tion $a_2$ this causes the normally opened contact $c_f$ to move to the closed position. In this position a current path is established from ground through closed contact $y$, contact $e_2$ arm 32 of switch 31, closed contact $c_f$, and relay solenoid F to voltage source 33. This energizes the relay solenoid F causing a closure of normally open con-tact $f_1$, which locks relay F in to the energized position.

The rotary switch means 31 then steps to position 5 in readiness to receive the next character of the answer-back signal format. If the character N is received in this position a normally opened contact $C_n$ will be operated to move to the closed position establishing a current path from ground through contact $y$, contact $l_2$, rotary arm 32, contact $C_n$, and relay solenoid N to potential source 33. The energization of relay solenoid N causes the closure of normally opened contacts $n_1$, and $n_2$, thereby locking relay solenoid N into the energized position. The remaining two positions, namely positions 6 and 7, are examined in the same fashion and when the characters E and C are re-ceived at the calling location $a_2$, the normally open con-tacts $C_e$ and $C_c$, respectively, will close causing the energization of relay solenoids E and C respectively which will in turn lock in to the energized position through their relay contacts $e_1$ and $c_1$ respectively. Also in a like manner the energized solenoids E and C will cause closure of their normally opened contact $e_2$ and $c_2$ respectively, establishing a current path from ground through contact sets $f_2$, $n_2$, $e_2$, $c_2$, and relay solenoid L to potential source 33.

The energization of relay solenoid L causes closure of normally open contact $l_1$, opening of normally closed contact $l_3$ and movement of contact $l_2$. Closure of contact $l_1$ locks relay solenoid L into the energized state. The operation of contact $l_2$ establishes a current path from ground through contact $y$, contact $l_2$, and lamp OK to the voltage source 33. This causes lamp OK to light, indicating the receipt of an answer-back code which establishes the fact that the called party is a member of the establishment A and is entitled to receive the data communication. To provide for more automatic operation, the energization of the circuit including lamp OK may be connected at 34 to the data transmission means (not shown) to automatically initiate data transmission from the calling party to the called party. As soon as all data is communicated over this link, the normally closed contact $z$ is opened causing deenergization of the relay solenoid L thereby deenergizing the lamp OK which in turn may also disable the data communications transmitter means (not shown).

It should also be noted that upon energization of the relay solenoid L the normally closed contact $l_3$ moves to the open position causing the deenergization of the relay solenoids F, N, E, and C, which in turn causes the contact sets $f_1$–$f_2$, $n_1$–$n_2$, $e_1$–$e_2$, and $c_1$–$c_2$, respectively to move to the open positions in readiness for subsequent data communications.

If at least one or possibly more of the characters F, N, E, and C are missing from the positions 4 through 7, of the answer-back signal format $A_nS$, then its associated relay solenoid will not become energized by failing to establish its current path through the relay solenoid L. The result of this is that the contact $l_2$ will remain in the position shown in FIG. 3 and that the arm 32 of stepping switch 31 will then step to position 8, establishing a current path from ground through contact $y$, contact $l_2$, arm 32, and lamp AL in voltage source 33. Energization of lamp AL thereby indicates that the called party lacks the answer-back format identifying it as a subscriber which is a member of the establishment A which is an indication that the calling party should not initiate data transmission to the called party. When the lamp AL is lit, the calling party may, if desired, resume the calling challenge and place a second call. The rotary switch 31 is reset to the normal position in the usual manner, upon release of the call, or upon completion of the communication cycle. If the answer-back format still fails to provide a valid answer-back code, after reinitiation of the call, the calling party may then terminate the challenge.

Figure 2B:
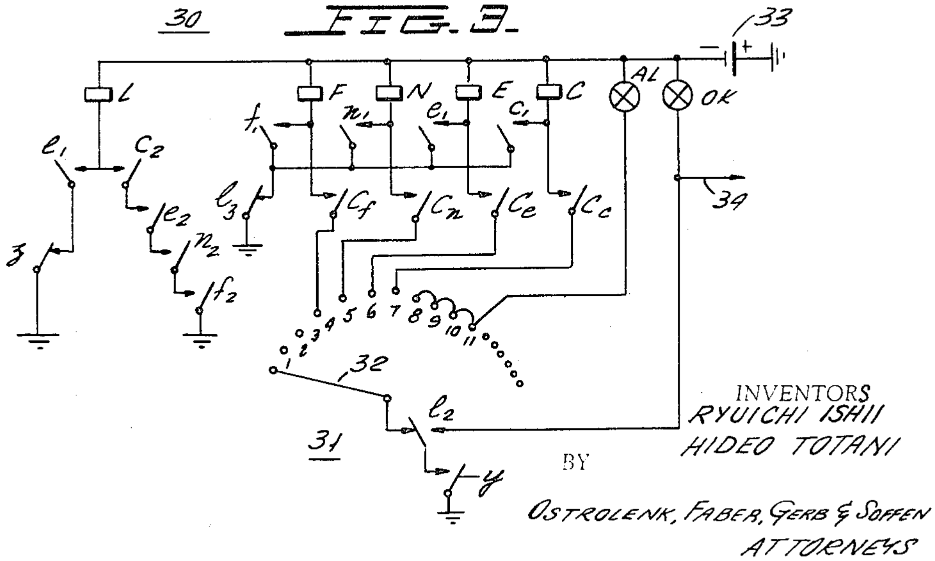

If it is desired to provide the call letters in positions within the answer-back signal format other than the position 4 through 7 as shown in FIG. 2, this may quickly and readily be done by changing the connections of the contacts $C_f$, $C_n$, $C_e$, and $C_c$ to the contacts 4 through 7 of the rotary switch 31, and the reconnections may be established in any other desired format. It is also possible to alter the identifying characters F, N, E, and C so as to place them in a different order or so as to substitute them for other characters. This provides additional flexibility in the system to insure the fact that subscriber members belonging to the establishment in A would not be confused with subscriber members belonging to other establishments or general subscriber members belonging to no establishment.

Although the invention has been described above with reference to a system for discriminating signals by a combination of characters and character positions, the discrimination can be achieved accurately in an exchange system where AM modulation is prescribed for answer-bacl signal by making use of the difference in frequency of th answer-back signals. This is accomplished, by way o example, by sequentially generating tone frequency signal $f_{pi}$, $f_{oi}$, $f_{ii}$, and $f_{si}$ in (any two or more of which may b the same) $S_p$, $S_0$, $S_i$, and $S_s$, respectively, in FIG. 2(A which represent collectively a certain establishment, an also forming $f_{pj}$, $f_{oj}$, $f_{ij}$, and $f_{sj}$ (any two or more of whicl may be the same) in $S_p$, $S_0$, $S_i$, and $S_s$ representing anothe establishment. Also, more than a pair of the above inter ruptions $f_{pj}$, $f_{oi}$, $f_{ii}$, and $f_{si}$, and $f_{pj}$, $f_{0j}$, $f_{ij}$, and $f_{sj}$, ma have the same frequencies. If the frequency difference i also utilized for the discrimination purpose, a frequenc discriminating circuit must of course be incorporated i the system in accordance with well-known methods.

Although there has been described a preferred embodi ment of this novel invention, many variations and modifi cations will now be apparent to those skilled in the art Therefore, this invention is to be limited, not by the spe cific disclosure herein, but only by the appending claims The embodiments of the invention in which an exclu sive privilege or property is claimed are defined as fol lows:

1. Means for establishing the identity of a called sub scriber and enabling the initiation of data transmissio from a calling subscriber to a called subscriber in a tele phone network serving a plurality of subscribers, wherei said called subscriber transmits an answer back code hav ing a predetermined code format, said means comprisin first means for examining selected code positions of sai answer back code format lesser in number than the tota code positions of said code format; second means bein energized only when predetermined coded characters ar received in said selected code positions; third means bein energized immediately upon receipt of the last of the se lected code positions and when all of said predetermine characters are present in all of said selected code posi tions to provide a visual indication of receipt of a vali answer back code of a subscriber entitled to receive sai data transmission; fourth means being energized to pro vide a second visual indication when it least one of th predetermined characters is not received in said selecte code positions.

2. Means for establishing the identity of a called sub scriber and initiating data transmission from a calling sub scriber to a called subscriber in a telephone network serv ing a plurality of subscribers, wherein said called sub scriber transmits an answer back code having a prede termined code format, said means comprising; a plural ity of normally deenergized first relay means; a pluralit of normally open switch means each being connected i series with an associated first relay means; a voltag source; rotary switch means for sequentially connectin each series connected first relay means and switch mean to said voltage source; each of said switch means bein closed upon receipt of a predetermined coded character t establish a current path for its associated first relay mean to energize the first relay means, second relay means; plurality of normally open contact sets connected in se ries with said second relay means each being controlle by an associated first relay means; said contact sets bein moved to the closed position upon energization of it associated first relay means; said contact sets establish ing a closed current path between said second relay mean and said voltage source when all of said first relay mean are energized; first and second visual indicating means fo indicating the receipt of valid and invalid answer-bac code formats respectively; said rotary switch means es tablishing a closed current path comprised of said voltag source and said second visual indicating means after th last of said first relay means has been sequentially con nected to said voltage source; second contact means con trolled by said second relay means for connecting sai rotary switch means to said voltage source when said sec ond relay means is in the deenergized state and for dis connecting said rotary switch means from said voltage source and connecting said first visual indicating means to said voltage source when said second relay means is in the energized state.

3. Means for establishing the identity of a called subscriber and initiating data transmission from a calling subscriber to a called subscriber in a telephone network serving a pluraltiy of subscribers, wherein said called subscriber transmits an answer back code having a predetermined code format, said means comprising; a plurality of normally deenergized first relay means; a plurality of normally opened switch means each being connected in series with an associated first relay means; a voltage source; rotary switch means for sequentially connecting each series connected first relay means and switch means to said voltage source; each of said switch means being closed upon receipt of a predetermined coded character to establish a current path for its associated first relay means to energize the first relay means, second relay means; a plurality of normally open contact sets connected in series with said second relay means each being controlled by an associated first relay means; said contact sets being moved to the closed position upon energization of its associated first relay means; said contact sets establishing a closed current path between said second relay means and said voltage source when all of said first relay means are energized; first and second visual indicating means for indicating the receipt of valid and invalid answer-back code formats respectively; said rotary switch means establishing a closed current path comprised of said voltage source and said second visual indicating means after the last of said first relay means has been sequentially connected to said voltage source; second contact means controlled by said second relay means for connecting said rotary switch means to said voltage source when said second relay means is in the deenergized state and for disconnecting said rotary switch means from said voltage source and connecting said first visual indicating means to said voltage source when said second relay means is in the energized state; each of said first relay means comprising third contact means operable upon energization of its associated first relay means to lock said first relay means into the energized state.

4. Means for establishing the identity of a called subscriber and initiating data transmission from a calling subscriber to a called subscriber in a telephone network serving a plurality of subscribers, wherein said called subscriber transmits an answer back code having a predetermined code format, said means comprising; a plurality of normally deenergized first relay means; a plurality of normally opened switch means each being connected in series with an associated first relay means; a voltage source; rotary switch means for sequentially connecting each series connected first relay means and switch means to said voltage source; each of said switch means being closed upon receipt of a predetermined coded character to establish a current path for its associated first relay means to energize the first relay means, second relay means; a plurality of normally open contact sets connected in series with said second relay means each being controlled by an associated first relay means; said contact sets being moved to the closed position upon energization of its associated first relay means; said contact sets establishing a closed current path between said second relay means and said voltage source when all of said first relay means are energized; first and second visual indicating means for indicating the receipt of valid and invalid answer-back code formats respectively; said rotary switch means establishing a closed current path comprised of said voltage source and said second visual indicating means after the last of said first relay means has been sequentially connected to said voltage source; second contact means controlled by said second relay means for connecting said rotary switch means to said voltage source when said second relay means is in the deenergized state and for disconnecting said rotary switch means from said voltage source and connecting said first visual indicating means to said voltage source when said second relay means is in the energized state; each of said first relay means comprising third contact means operable upon energization of its associated first relay means to lock said first relay means into the energized state; said second relay means comprising fourth contact means for deenergizing all of said first relay means upon energization of said second relay means.

5. Means for establishing the identity of a called subscriber and initiating data transmission from a calling subscriber to a called subscriber in a telephone network serving a plurality of subscribers, wherein said called subscriber transmits an answer back code having a predetermined code format, said means comprising; a plurality of normally deenergized first relay means; a plurality of normally opened switch means each being connected in series with an associated first relay means; a voltage source; rotary switch means for sequentially connecting each series connected first relay means and switch means to said voltage source; each of said switch means being closed upon receipt of a predetermined coded character to establish a current path for its associated first relay means to energize the first relay means, second relay means; a plurality of normally open contact sets connected in series with said second relay means each being controlled by an associated first relay means; said contact sets being moved to the closed position upon energization of its associated first relay means; said contact sets establishing a closed current path between said second relay means and said voltage source when all of said first relay means are energized; first and second visual indicating means for indicating the receipt of valid and invalid answer-back code formats respectively; said rotary switch means establishing a closed current path comprised of said voltage source and said second visual indicating means after the last of said first relay means has been sequentially connected to said voltage source; second contact means controlled by said second relay means for connecting said rotary switch means to said voltage source when said second relay means is in the deenergized state and for disconnecting said rotary switch means from said voltage source and connecting said first visual indicating means to said voltage source when said second relay means is in the energized state; each of said first relay means comprising third contact means operable upon energization of its associated first relay means to lock said first relay means into the energized state; said second relay means comprising fourth contact means for deenergizing all of said first relay means upon energization of said second relay means; and fifth contact means controlled by the energization of said second relay means to lock said second relay means in to the energized state.

6. Means for establishing the identity of a called subscriber and initiating data transmission from a calling subscriber to a called subscriber in a telephone network serving a plurality of subscribers, wherein said called subscriber transmits an answer back code having a predetermined code format, said means comprising; a plurality of normally deenergized first relay means; a plurality of normally opened switch means each being connected in series with an associated first relay means; a voltage source; rotary switch means for sequentially connecting each series connected first relay means and switch means to said voltage source, each of said switch means being closed upon receipt of a predetermined coded character to establish a current path for its associated first relay means to energize the first relay means, second relay means; a plurality of normally open contact sets connected in series with said second relay means each being controlled by an associated first relay means; said contact sets being moved to the closed position upon energization of its associated first relay means; said contact sets establishing a closed current path between said second relay means and said voltage source when all of said first relay means are energized; first and second visual indicating means for indicating the receipt of valid and invalid answer-back code formats respectively; said rotary switch means establishing a closed current path comprised of said voltage source and said second visual indicating means after the last of said first relay means has been sequentially connected to said voltage source; second contact means controlled by said second relay means for connecting said rotary switch means to said voltage source when said second relay means is in the deenergized state and for disconnecting said rotary switch means from said voltage source and connecting said first visual indicating means to said voltage source when said second relay means is in the eneregized state; each of said first relay means comprising third contact means operable upon energization of its associated first relay means to lock said first relay means into the energized state; said second relay means comprising fourth contact means for deenergizing all of said first relay means upon energization of said second relay means; and fifth contact means controlled by the the energization of said second relay means to lock said second relay means into the energized state; sixth contact means for deenergizing said second relay means when said data transmission has been completed.

7. Means for establishing the identity of a called subscriber and initiating data transmission from a calling subscriber to a called subscriber in a telephone network serving a plurality of subscribers, wherein said called subscriber transmits an answer back code having a predetermined code format, said means comprising; a plurality of normally deenergized first relay means; a plurality of normally opened switch means each being connected in series with an associated first relay means; a voltage source; rotary switch means for sequentially connecting each series connected first relay means and switch means to said voltage source; each of said switch means being closed upon receipt of a predetermined coded character to establish a current path for its associated first relay means to energize the first relay means, second relay means; a plurality of normally open contact sets connected in series with said second relay means each being controlled by an associated first relay means said contact sets being moved to the closed position upon energization of its associated first relay means; said contact sets establishing a closed current path between said second relay means and said voltage source when all of said first relay means are energized; first and second visual indicating means for indicating the receipt of valid and invalid answer-back code formats respectively; said rotary switch means establishing a closed current path comprised of said voltage source and said second visual indicating means after the last of said first relay means has been sequentially connected to said voltage source; second contact means controlled by said second relay means for connecting said rotary switch means to said voltage source when said second relay means is in the deenergized state and for disconnecting said rotary switch means from said voltage source and connecting said first visual indicating means to said voltage source when said second relay means is in the energized state; each of said first relay means comprising third contact means operable upon energization of its associated first relay means to lock said first relay means into the energized state; said second relay means comprising fourth contact means for deenergizing all of said first relay means upon energization of said second relay means; and fifth contact means controlled by the energization of said second relay means to lock said second relay means into the energized state; sixth contact means for deenergizing said second relay means, and seventh contact means for deenergizing said first visual indicating means when said data transmission has been completed.

References Cited

UNITED STATES PATENTS

| | | | |
|---|---|---|---|
| 2,944,247 | 7/1960 | Breese | 340—163 |
| 3,046,525 | 7/1962 | Deming et al. | 340—163 |
| 3,222,646 | 12/1965 | Hammer | 340—163 |
| 3,030,470 | 2/1967 | Brixner et al. | 340—163 |

ROBERT L. GRIFFIN, *Primary Examiner.*

J. TERRY STRATMAN, *Assistant Examiner.*